United States Patent [19]

Latinen, deceased

[11] 3,752,489

[45] Aug. 14, 1973

[54] SELF-FLUSHING SHAFT SEAL

[75] Inventor: George A. Latinen, deceased, late of Springfield, Mass. by May V. Latinen, administratrix

[73] Assignee: Monsanto Company, St. Louis, Mo.

[22] Filed: Aug. 16, 1971

(Under Rule 47)

[21] Appl. No.: 172,061

[52] U.S. Cl............... 277/64, 277/67, 277/134, 259/191, 259/DIG. 16
[51] Int. Cl............................................. F16j 15/54
[58] Field of Search................... 277/64, 67, 134, 277/58; 259/191, DIG. 16

[56] References Cited
UNITED STATES PATENTS

| 3,292,847 | 12/1966 | Herrick | 277/67 X |
| 3,476,396 | 11/1969 | Buhl | 277/134 X |
| 1,163,045 | 12/1915 | Symons | 277/134 X |

FOREIGN PATENTS OR APPLICATIONS

| 1,481,564 | 4/1967 | France | 277/134 |
| 244,627 | 12/1925 | Great Britain | 277/134 |

Primary Examiner—Samuel B. Rothberg
Attorney—James C. Logomasini, Neal E. Wills and Donald W. Peterson

[57] ABSTRACT

Described herein is an assembly whereby a shaft seal employing a viscoseal-type sealing screw is self flush cooling with the same process liquid used to establish, in combination with such screw, the desired seal. The seal is functional under variable differential pressure conditions. For operating conditions when the shaft in the vicinity of the seal is not immersed in process liquid, a coacting second, or back up, seal is provided to prevent loss of pressure in the region of the process liquid.

3 Claims, 6 Drawing Figures

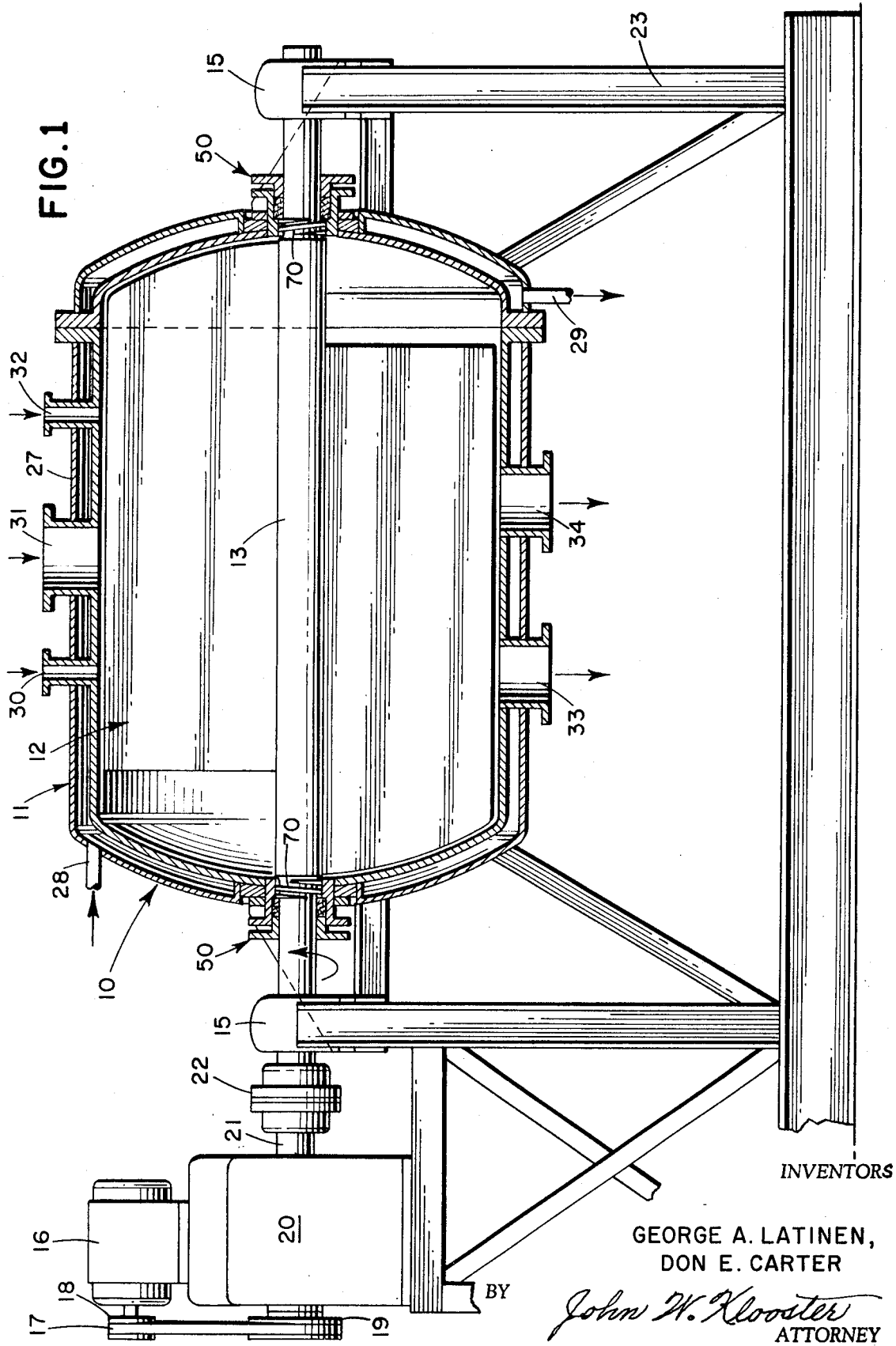

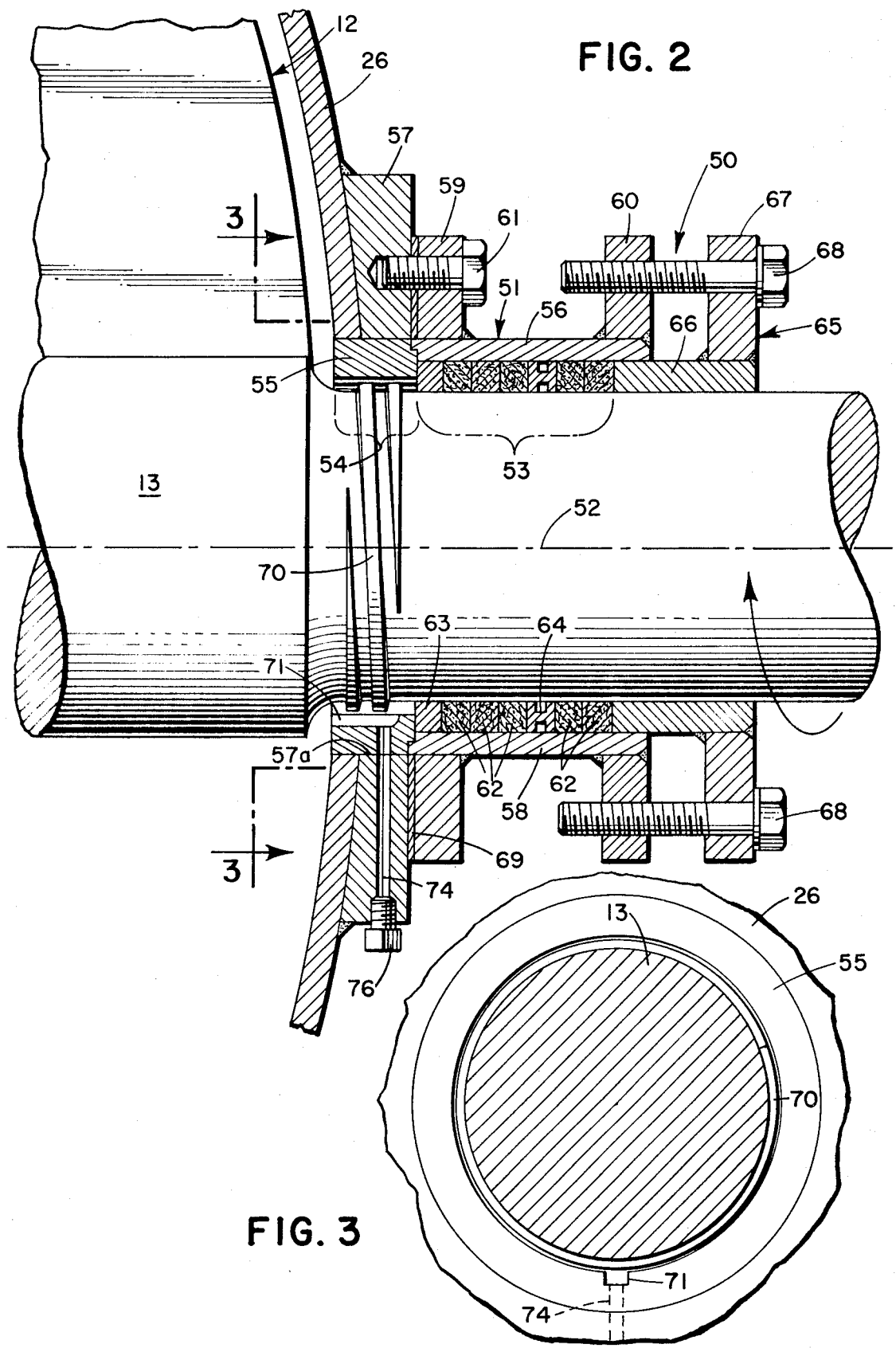

SELF-FLUSHING SHAFT SEAL

BACKGROUND

When employing on an industrial scale a stirred tank reactor in substantially any spatial orientation for mixing or reacting and especially when the agitator used in such tank is being continuously operated, it is necessary to have a seal between the agitator shaft and the tank housing in the region where the shaft extends through the tank wall. In a typical situation, the tank is being used to process fluids under conditions where pressures above or below atmospheric prevail within the interior.

Mechanical devices such as a conventional viscoseal-type shaft sealing screw, appear to be more reliable and trouble-free than packing glands or mechanical seals because they are less subject to wear and may be employed to seal shafts operating under predictable conditions over a known set of parameters including shaft speeds, process pressures, process fluid viscosities, and the like.

A viscoseal-type sealing screw assembly, as those skilled in the art appreciate, can be regarded as a single screw pump of the type which operates by making use of the viscosity of the fluid being pumped. Thus, in a conventional viscoseal-type sealing screw assembly within a hub region defined in a housing adjacent a pressurized fluid filled zone where a revolving shaft extends axially therethrough, reverse screw threads are located. Such threads are located either on the hub or on the shaft. The threads extend circumferentially about the shaft and the hub. When the shaft rotates at a predetermined speed and fluid from the pressurized zone is pushed against the threads, a seal is formed between the hub and the shaft by the fluid and the threads.

Grooves between thread ribs fill with fluid and bridge a small gap between hub and shaft. Because the fluid in a groove has substantial viscosity, it tends to be dragged along by the revolving shaft in a circumferential direction. Such fluid movement, however, is stopped by a screw thread whose land area acts as a barrier to such fluid flow. At such barrier, the force exerted on such fluid may be resolved into a component perpendicular to the walls of the groove formed by the thread and a component parallel to the direction of the groove formed by adjacent threads. Since the groove is open at the end, the tendency of the force exerted parallel to the direction of the groove is to cause movement of the fluid along the groove. In a conventional viscoseal-type sealing screw, the groove fills until the force parallel to the direction of the groove equals the pressure force at the end of the groove.

Mechanical sealing devices, such as the viscoseal-screw, suffer from a number of serious problems, however, which have heretofore tended to limit their usefulness as seals for rotating shafts operating in such a tank. Thus, such a device operates by design only with a liquid at some predetermined fluid pressure/fluid viscosity/shaft speed interrelationship which may not always prevail in such a tank which creates the situation of what to do for a seal when such predetermined interrelationship is, for some reason, interrupted. In addition, some such tanks operate at less than capacity on occasion, by design or expediency, and under such conditions, the agitator shaft may, at most, be only occasionally moistened by process liquid so there is not enough process liquid at the seal site to provide a continuous seal.

Furthermore, a conventional viscoseal screw assembly inherently and necessarily dissipates mechanical energy during operation and converts much of this energy into heat because the liquid between the moving shaft and the stationary hub or housing is in viscous shear. This heat must necessarily be transferred from the active length of the seal by some means. When the viscosity of a fluid is low, for example, when the fluid is water, lubricating oil, gasoline, or the like, the active length of a viscoseal-type seal tends to be long, and the generation of heat per unit length, small. In such a case, the heat may generally be removed without excessive temperature buildup in the fluid used for sealing through the use of such means as a cooling fluid jacket on the housing (or barrel), radiation, transfer of heat along the shaft and/or housing, or the like. However, when the viscosity of the fluid is high, for example, when the fluid is a melted polymer, or the like, the active length of a viscoseal-type seal tends to be short, and the generation of heat per unit length tends to be very high. In this case, as in a tank as mentioned above, it may not be possible conveniently to remove heat from the active length rapidly enough by external cooling means to prevent excessively high temperatures from building up in the active length of the seal. Such a temperature buildup can cause the fluid in the seal to degrade and decompose or it can cause the viscosity of the fluid to decrease to the point where it is ineffective in producing sealing action in the seal. The product fluid adjacent to the seal may become contaminated with undesirable degradation products.

Thus, conventional viscoseal-type sealing screw assemblies are limited in usefulness and in application, particularly as respects rotating shafts in stirred tanks containing process fluids. There has now been discovered, however, a sealing technique which overcomes the disadvantages above described even though it utilizes a viscoseal-type sealing screw assembly and which is thus very well suited for use in tanks having horizontally rotating shafts extending therethrough. The usefulness of viscoseal-type sealing screw assemblies has thus been surprisingly and unexpectedly extended.

The technique involves the use of a fluid, such as a viscous process liquid in a horizontally oriented, continuously stirred mixer or reactor, to flush and cool a viscoseal-type sealing screw assembly. So long as the screw assembly is bathed by the fluid, a seal is operatively made between housing and shaft and the fluid in the seal is continuously changed by fresh fluid pumped through the seal by the seal itself and then returned to the main body of the fluid. The heat generated in the seal appears as sensible heat in the stream of fluid circulated through the seal. The rate of fluid circulation through the seal is chosen so that the rise in temperature of the fluid in the seal is small enough so that the fluid will not be heated enough to degrade it or impair its sealing effectiveness (viscosity). The technique is usable under variable differential pressure conditions where pressures on the sealing screw vary and are different from those on the other side of the sealing screw assembly.

SUMMARY

The present invention is directed to a self-flushing and cooling shaft sealing apparatus for use with a viscoseal-type sealing screw means where a sealed shaft is expected to rotate through a housing wall where, on one side thereof, the shaft is intermittently in either a liquid phase or a gas phase while, on the other side thereof, this shaft is in a constant fluid (liquid or gaseous) environment, such as the atmosphere. The apparatus utilizes a fluid tight, elongated housing means having at adjacent adjoining regions therein along a common axis a couple of sealing chambers. Through the chambers extends the shaft to be sealed.

One of the chambers is filled with a viscoseal-type sealing screw which is adapted to form a seal between the shaft and the housing when the one side of the housing wall is bathed by liquid. The other of the chambers is filled with a conventional packing material which is adapted to form a seal between the shaft and the housing when such side is in a gaseous envelope. A special notch or conduit means in the one chamber with the screw causes liquid circulation when the shaft is rotating.

DRAWINGS

The present invention will be better understood by reference to the attached drawings wherein:

FIG. 1 is a diagrammatic side elevational view of a horizontal, continuously stirred tank mixer/reactor suitable for utilizing therein a self-flushing and cooling apparatus of the present invention;

FIG. 2 is an enlarged vertical longitudinal sectional view through one of the shaft sealing portions of a mixer/reactor of the type shown in FIG. 1;

FIG. 3 is a vertical transverse sectional view taken along line 3—3 of FIG. 2;

DETAILED DESCRIPTION

Figure 4:
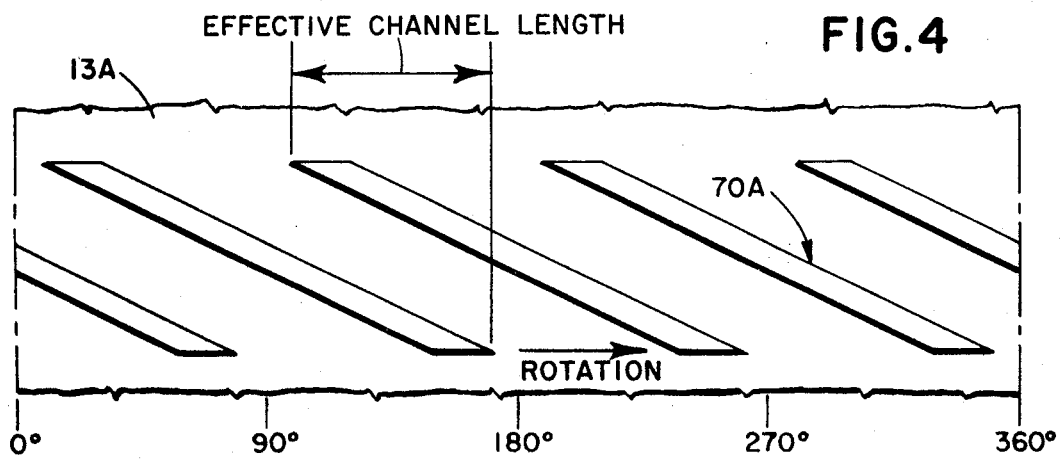
FIG. 4 is a developed elevational view of a multiple thread viscoseal screw.

Referring to FIG. 1, there is seen, for example, a mixer/reactor assembly of the Latinen type, herein designated in its entirety by the numeral 10, which utilizes an embodiment of the present invention. Reactor 10 is seen to comprise a vessel assembly 11 having an impeller assembly 12. Impeller 12 extends through vessel 11 on a shaft 13. Where it passes through vessel 11, shaft 13 is sealed by seals 50 (paired). Shaft 13 is journaled for rotational movements by a pair of bearing assemblies 15.

A motor 16 is connected by a belt 17 over sheaves 18 and 19 to a transmission or reducer 20. Transmission 20 has a drive shaft 21 which interconnects with shaft 13 through a coupling 22. The mixer/reactor assembly 10 is supported by a frame 23.

Vessel 11 has an inner wall 26 and spaced therefrom, an outer wall 27, with the space therebetween serving for circulation therethrough of a heating or cooling fluid, as through an input conduit 28 and an output conduit 29. Material (not shown) for mixing and/or reacting may be fed into vessel 11 through conduits 30, 31, and/or 32 continuously or discontinuously and may be removed therefrom through conduits 33 and/or 34 in conventional ways as those skilled in the art will appreciate. For example, if assembly 10 is to be used as a reactor for continuous mass polymerization of a monomer such as styrene, conduit 31 may be connected to a reflux condenser assembly (not shown); styrene may be continuously sprayed into vessel 11 through a conduit 30, mass polymerized in a partially filled vessel 11, and then continuously removed from vessel 11 through conduit 34, agitation being accomplished by the revolution of impeller 12.

Turning to FIG. 2, there is seen an enlarged, detailed view of the self-flushing and cooling shaft seal assembly which is designated in its entirety by the numeral 50 as employed in the mixer/reactor shown in FIG. 1. Each seal 50 employs a fluid tight, elongated housing means 51 having definable and defined therein at adjacent, adjoining regions along a common axis 52 extending therethrough a first cylindrical sealing chamber 53 which is coaxial with axis 52 and a second cylindrical sealing chamber 54 which is coaxial with axis 52. The housing means 51 is open at its respective opposite end portions in regions around axis 52.

Housing means 51 is formed by sleeve 55 and packing gland 56. Welded circumferentially about an aperture 57a formed in the inner wall 26 is a flange 57. Press fit (or welded) into flange 57 is sleeve 55. Packing gland 56 is seen to comprise a sleeve 58 to the opposite outside circumferential surfaces of which are welded flange 59 and 60. Gland 56 is mounted in abutting relationship to sleeve 55 by mounting flange 59 against flange 57 with bolts 61 turned into appropriately threaded holes in flange 57. A gasket 69 is interposed between flange 57 and flange 59 for sealing.

A rotatably mounted shaft 13 which is coaxial with axis 52 extends through housing means 51. In first sealing chamber 53 between shaft 13 and housing means 51 is packing 62, which can be of any conventional sort. In the embodiment shown, a spacer 63 is placed in first sealing chamber 53 adjacent second sealing chamber 54, and a lantern ring 64 is placed in packing 62 to improve sealing efficiency. Any convenient seal can here be used.

A packing follower 65 is functionally associated with first sealing chamber 53 to impart and maintain compacting pressure against packing 62. Packing follower includes a sleeve 66 which is adapted to circumscribe shaft 13 and fit between shaft 13 and sleeve 58 of packing gland 56 so that the forward end of sleeve 66 can ram against packing 62. A flange 67 is welded to the rear outside circumferential surfaces of sleeve 66, and bolts 68 extend through flange 67 into appropriately threaded holes in flange 60 whereby sleeve 66 can be drawn against packing 62. Packing 62 and packing follower 65 coact to form a seal between shaft 13 and housing means 51 against predetermined low viscosity fluid (gas or low viscosity liquid) pressures exerted thereagainst from either opposite (open) end region of housing means 51 when shaft 13 rotates at predetermined speed. Any convenient packing gland assembly may be employed in the present invention as those skilled in the art will readily appreciate.

A viscoseal-type screw 70 is located in second sealing chamber 54 which in this embodiment is located on shaft 13, but which could be located on the inner wall of sleeve 55. The circumferentially extending, radially projecting ribs of screw 70 are adapted to form in cooperation with relatively high viscosity fluid (e.g., a liquid) from the vessel 11 of assembly 10 a screw pump which pumps the fluid from vessel 11 toward the packing 62 when shaft 13 rotates at a predetermined speed.

The pressure at the discharge of screw 70 is therefore greater than the pressure existing in vessel 11 by the head generated by the screw 70. The packing 62 prevents outward flow of fluid from the space between the screw and the packing. Provided the pressure generated by the screw in the volume between the screw discharge and the packing is greater than the pressure difference between the exterior and interior, there can be no leakage of gas vapor or liquid from the exterior to the interior of vessel 11. There may be a slight leakage of the fluid from vessel 11 out through the packing; this is expected and even desired to lubricate and prolong the life of the packing.

As mentioned previously, highly viscous fluids generate considerable heat in viscoseals and, if they remain in the seal a prolonged period of time, therefore may tend to degrade, discolor and lose viscosity. In order to remove the heat and limit the exposure of fluid to conditions prevailing in the viscoseal, an axially extending slot 71 is defined in sleeve 55 in second sealing chamber 53 of housing means 51. Slot 71 extends from an edge of sleeve 55 adjacent vessel 11 to a point inwardly about opposite the end of the ribs of viscoseal screw 70. Slot 71 is adapted to cause movement of such viscous fluid therethrough from second sealing chamber 54 back into vessel 11 past the end of housing means 51 when shaft 13 rotates at a predetermined speed and when such viscous liquid or fluid is pressurized to a predetermined (designed) extent against the region of said housing means 51 adjacent vessel 11 interior. Instead of slot 71, one could employ a hole sleeve 55 to conduct fluid back to the interior of vessel 11.

The viscoseal screw 70 is designed so that it will generate at all expected operating conditions of shaft rotational speed and fluid viscosity a pressure at least equal to the pressure difference between interior and exterior of mixer/reactor 10. Shaft speeds for shaft 13 can range very widely, but it is presently preferred to use speeds below 200 rpm.

A radial drilled hole 74 in flange 57 connects slot 71 with the exterior of vessel 11 when threaded plug 76 is removed from the outside end of hole 74. Thus, sealing chamber 54 can be drained when the mixer is shut down.

In designing a viscoseal screw, one selects a screw which will produce the desired pressure having regard to the existing condition of shaft speed, shaft diameter, fluid viscosity, and the limiting constructional dimensional tolerances. Calculation methods described by Schenkel [Schenkel, Gerhard, *Plastics Extrusion Technology and Theory*, London, Iliffe Books, Ltd. (1966), page 98, et seq.] may be used to estimate the pressure developed by a given viscoseal screw. Thus, the total flow Q developed by a screw pump consists of three partial flows combined in the equation:

$$Q = Q_D - Q_P - Q_L$$

wherein $Q_D$ (the drag flow) is the axial flow from low to high pressure generated by the interaction of the screw with its housing;

$Q_P$ is the axial flow from high to low pressure along the grooves as a result of the pressure gradient along the groove; and $Q_L$ is the axial flow from high to low pressure over the screw lands as a result of pressure difference between adjacent grooves.

In the viscoseal screw described in this disclosure of the invention, the net fluid flow in the seal at steady operating conditions equals Q, the desired flow from the screw discharge through slot 71 back to the interior of vessel 11.

$$Q_D - Q_P - Q_L$$

These three terms may be calculated from the following equations:

$$Q_D = (\pi^2 d^2 h n \sin \phi \cos \phi)/2$$
$$Q_P = (\pi d h^3 \sin^2 \phi / 12\eta) \cdot [(p_2 - p_1)/l_2]$$
$$Q_L = (\pi^2 d^2 \delta^3 \tan \phi / 12\eta' e) \cdot [(p_2 - p_1)/l_2]$$

wherein
$d$ = screw diameter
$h$ = groove depth
$\phi$ = helix angle of thread
$\tan \phi$ = pitch of thread/$d$
$e$ = land width
$\delta$ = radial clearance of lands
$n$ = number of thread starts
$\eta$ = fluid viscosity in grooves
$\eta'$ = fluid viscosity over lands
$l_2$ = effective axial length of screw
$p_2$ = pressure at high pressure end of screw $p_1$ = pressure at low pressure end of screw In designing a viscoseal screw, various values of $d$, $h$, $\phi$, $e$, $\delta$, and $n$ are assumed, and the length $l_2$ is calculated. When a combination which gives a reasonable length is found, that design is selected. In using the equations, the various terms may be expressed in any set of consistent engineering units.

In designing the length and diameter of the slot, the well known equations for calculating the pressure drop for liquid flowing through an annulus are employed. These equations are given by Schenkel on pages 114–115.

In FIG. 4 is shown an alternative embodiment for a viscoseal-type sealing screw which is herein designated in its entirety by the numeral 70A and which is adaptable for use in sealing chamber 54 (see FIG. 2). The individual threads of screw 70A each do not circumferentially circumscribe shaft 13A but rather extend only a short distance helically about shaft 13A. Effective channel length between circumferentially adjacent threads of screw 70A is labeled in FIG. 4.

Figure 5:
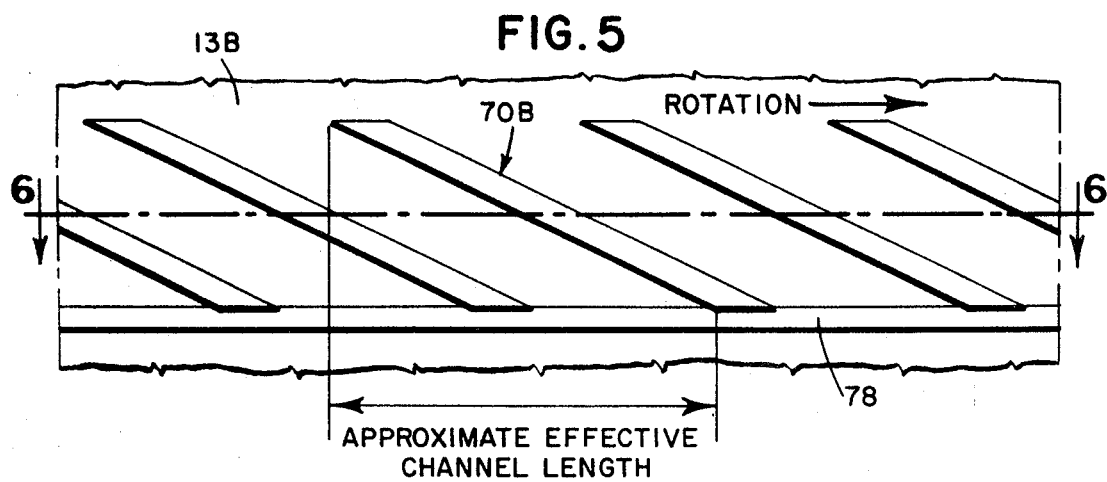
FIG. 5 is a developed elevational view of a modified multiple thread viscoseal screw having an end dam.
Figure 6:
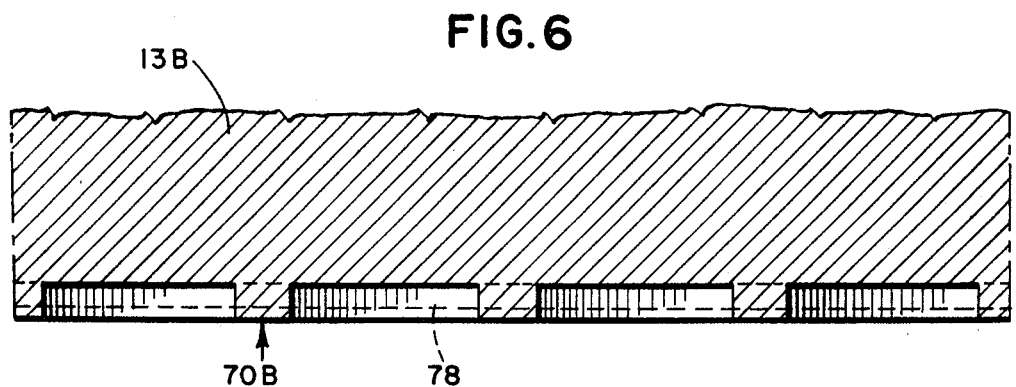
FIG. 6 is a sectional view taken along line 6—6 of FIG. 5.

In FIGS. 5 and 6 is shown a further alternative embodiment for a viscoseal-type sealing screw which is herein designated in its entirety by the numeral 70B and which is adaptable for use in sealing chamber 54 (see FIG. 2). Screw 70B is similar to screw 70A generally but is equipped with an integral dam 78 which effectively lengthens the useful channel length between circumferentially adjacent threads of screw 70B on shaft 13B as labeled in FIG. 6. While the radial height of dam 78 is shown in FIGS. 5 and 6 as being less than that of the associated threads of screw 70B, this height of dam 78 can approximate that of such threads, if desired, depending upon individual intended use considerations, as those skilled in the art will appreciate. The end dam 78 should be located at the end of screw 70B furthest away from the interior of mixer 10 (see FIG. 1).

In the embodiments described above, the viscoseal screw threads are shown to be part of the rotating shaft and the housing enclosing them to be a smooth cylinder. It will be appreciated by those skilled in the art that the device will operate equally well if the threads are cut in the housing and the shaft surface is smooth. It will also be appreciated that the housing and threads need not necessarily be cylindrical. One can use any housing-thread configuration which has circular symmetry about the axis of the shaft, such as a frustum of a cone, is feasible and practical, and does not depart from the spirit and scoep of the present invention.

It will be appreciated that, while the embodiment of the present invention as shown and described herein is depicted in combination with a particular mixing vessel, the present invention can be utilized with any vessel, extruder, or the like, to achieve pressurized, viscous fluid feed intermittently to a chamber at low or high pressure along a shaft sealed with a screw means as taught herein; and it will be further appreciated that many variations and modifications of the present invention are feasible and practical without departing from the spirit and scope of the invention disclosed and claimed herein.

It will be appreciated that the self-flushing shaft seal of the present invention is adapted for use in combination with a vessel such as a reactor which is to be operated under vacuum conditions. Those skilled in the art will appreciate that under such operational conditions, it is possible to leak air into the vessel circumferentially about a shaft entering thereinto through the vessel wall. An oxygen leak not only destroys the pressure condition desired, but also, as for example in the case of certain polymers such as styrene/acrylonitrile, the oxygen can discolor polymer and promote unwanted side reactions. If the leak is gross, a fire hazard can be generated. When one uses the sealing assembly of the present invention, the viscoseal screw thereof can be considered to function in the manner of a pump pushing fluid contents of a vessel or reactor outwardly from the vessel interior to the vessel wall circumferentially of a revolving shaft. This pumping action places a positive pressure on the packing gland which is desirable and intended because such a pressurization minimizes leak problems about the packing gland. This invention can be considered to solve or aid in solving such problems as:

A. Sealing a reactor containing polymer where the pressure in the reactor may either be above or below the external atmospheric pressure. Some leakage outward from the reactor under pressure is tolerated but not air leaks in,
B. Using a viscoseal in such a way that it continually replaces the fluid in it, thereby removing heat and avoiding degradation and discoloration of fluid by keeping it in the seal a relatively long time,
C. Provides a mode for operating a seal when it is intermittently in contact with the fluid,
D. Seals fairly well during start up, i.e. when the fluid has too low viscosity for the seal to work well, and
E. Provides lubrication of the packing when the vessel is either under pressure or under vacuum.

What is claimed is:
1. A self-flushing shaft seal for a revolvable shaft adapted to turn in a fluid bath, said seal being functional under variable differential pressure conditions, said shaft seal comprising:
   A. a fluid tight, elongated housing means having definable therein at adjacent, adjoining regions along a common axis extending therethrough,
      1. a first radially symmetrical sealing chamber coaxial with said axis, and
      2. a second radially symmetrical sealing chamber coaxial with said axis,
   said housing means being open at its respective opposite ends around said axis, the open end adjacent said second sealing chamber being adapted for immersion in a fluid,
   B. a rotatably mountable shaft coaxial with said axis and extending through said housing means,
   C. packing means in said first sealing chamber between said shaft and said housing means,
   D. compression means functionally associated with said first sealing chamber and adapted to impart and maintain compacting pressure against said packing means,
   E. said packing means and said compression means being adapted cooperatively to form a seal between said shaft and said housing means against pressures exerted against the regions about said opposite end portions,
   F. viscoseal-type sealing screw means within said second sealing chamber circumferentially located either on said shaft or on said housing,
      1. said screw means having radially projecting, helically extending ribs,
      2. said screw means being adapted in combination with a predetermined fluid to increase the pressure at the boundary between the second sealing chamber and the first sealing chamber above the pressure existing in said fluid when said shaft rotates at a predetermined speed,
   G. axially extending conduit means defined in said housing extending generally from said open end adjacent said second sealing chamber to a circumferential location in said second sealing chamber about opposite the end of said ribs remote from said open end, said conduit means being adapted for movement of said fluid therethrough from the region in said second sealing chamber adjacent the end of said ribs to said open end when said shaft rotates at a predetermined speed, and
   H. said housing means being adapted for mounting through, but in sealable engagement with, a wall member, whereby the portion of said shaft in the region of said adjacent end portion is isolatable from the portion of said shaft in the region of the opposite end portion.

2. The shaft seal of claim 1 wherein said first and said second sealing chambers are cylindrical.

3. The shaft seal of claim 1 wherein said conduit means comprises an axially extending open groove formed in the inner wall of said housing means in said second sealing chamber.

* * * * *